(12) United States Patent
Drebenstedt

(10) Patent No.: US 11,344,854 B2
(45) Date of Patent: May 31, 2022

(54) MIXER ROTOR PIN WITH HOLE

(71) Applicant: KNAUF GIPS KG, Iphofen (DE)

(72) Inventor: Cass Drebenstedt, Sperry, IA (US)

(73) Assignee: KNAUF GIPS KG, Iphofen (DE)

( * ) Notice: Subject to any disclaimer, the term of this patent is extended or adjusted under 35 U.S.C. 154(b) by 0 days.

(21) Appl. No.: 16/817,365

(22) Filed: Mar. 12, 2020

(65) Prior Publication Data

US 2021/0283559 A1   Sep. 16, 2021

(51) Int. Cl.
| | |
|---|---|
| *B22C 5/00* | (2006.01) |
| *B01F 27/115* | (2022.01) |
| *B28C 5/14* | (2006.01) |
| *B01F 27/73* | (2022.01) |
| *B01F 35/10* | (2022.01) |

(52) U.S. Cl.
CPC ............ *B01F 27/115* (2022.01); *B01F 27/73* (2022.01); *B01F 35/10* (2022.01); *B28C 5/14* (2013.01)

(58) Field of Classification Search
CPC .......... B01F 7/0045; B01F 7/10; B01F 35/10; B01F 27/115; B01F 27/73
See application file for complete search history.

(56) References Cited

U.S. PATENT DOCUMENTS

| | | |
|---|---|---|
| 2,253,059 A | 8/1941 | Camp |
| 2,641,453 A | 6/1953 | Teale |
| 3,011,349 A | 12/1961 | Kratz |
| 3,071,995 A | 1/1963 | Ruthrauff, Jr. |
| 3,354,756 A | 11/1967 | Rusk |
| 3,459,620 A | 8/1969 | McCleary et al. |
| 4,015,830 A | 4/1977 | Lödige et al. |
| 4,399,948 A | 8/1983 | Treffner et al. |
| 5,199,333 A * | 4/1993 | Snyder, Jr. ............. B25B 13/50 81/176.15 |
| 6,059,444 A | 5/2000 | Johnson et al. |
| 6,193,408 B1 | 2/2001 | Miura et al. |
| 6,494,609 B1 | 12/2002 | Wittbold et al. |
| 7,222,725 B1 | 5/2007 | Somarakis et al. |
| D557,088 S | 12/2007 | Morgan |
| 7,690,834 B2 | 4/2010 | Nakamura et al. |
| 7,883,263 B1 | 2/2011 | Wenger et al. |

(Continued)

FOREIGN PATENT DOCUMENTS

| | | |
|---|---|---|
| CN | 108453669 A | 8/2018 |
| DE | 9311857 U1 | 6/1994 |

(Continued)

OTHER PUBLICATIONS

International Search Report and Written Opinion for PCT/US2020/050845 dated Dec. 15, 2020.

*Primary Examiner* — Anshu Bhatia
*Assistant Examiner* — Gregory Y Huan
(74) *Attorney, Agent, or Firm* — Greer, Burns & Crain, Ltd.; Philip T. Petti; Pradip Sahu

(57) ABSTRACT

An apparatus for inserting and removing a mixer rotor pin includes at least one rotor pin with a transverse bore, as well as a rod dimensioned for slidably engaging the transverse bore. The apparatus also includes a mixer rotor pin insertion and removal tool having a tool body. A bottom of the tool has a slot for selectively engaging the aforementioned rod upon insertion of the rod into the transverse bore, and a top of the tool has a non-circular socket for accommodating a driver tool.

15 Claims, 5 Drawing Sheets

(56) References Cited

U.S. PATENT DOCUMENTS

| | | | |
|---|---|---|---|
| 9,028,133 B2 | 5/2015 | Wenger | |
| 10,385,908 B2 | 8/2019 | Greegor et al. | |
| 2003/0219328 A1* | 11/2003 | Schultz | F16B 33/06 |
| | | | 411/378 |
| 2007/0163400 A1 | 7/2007 | Parise | |
| 2014/0341649 A1* | 11/2014 | Bryan | F16B 37/145 |
| | | | 404/35 |
| 2016/0308409 A1* | 10/2016 | Takahashi | H02K 21/46 |

FOREIGN PATENT DOCUMENTS

| | | | | |
|---|---|---|---|---|
| GB | 2289737 A | * | 11/1995 | B25B 13/48 |
| GB | 2289737 A | | 11/1995 | |
| KR | 20040024944 A | | 3/2004 | |
| SU | 908610 A1 | | 2/1982 | |
| WO | 2017/003437 A1 | | 1/2017 | |
| WO | WO-2017003437 A1 | * | 1/2017 | B65D 90/10 |

* cited by examiner

MIXER ROTOR PIN WITH HOLE

BACKGROUND

The present invention relates generally to an apparatus used in the production of gypsum wallboard panels, and more specifically to mixers used to generate the wallboard slurry which eventually becomes the core of the wallboard panels.

Gypsum wallboard slurry mixers are well known in the art, and suitable examples are described in U.S. Pat. Nos. 6,494,609; 6,059,444; and 3,459,620, all of which are incorporated by reference. Such mixers include a mixer housing inside which is mounted a rotating agitator. The term "agitator" encompasses several embodiments, including an impeller, a disc, or some other equivalent structure. Mixer pins or rotor pins are fixed and depend from an underside of a cover as part of the mixer housing, and also project upwardly from, and move with the agitator into gypsum slurry. Variations in the positioning of rotor pins are known, depending on the type of agitator and/or the design of the mixer. Rotor pins help "mix" the slurry—a combination of water, ground stucco, and other additives known in the art—and generate shear forces inside the mixer. Preferably, there are at least 9-12 pins in each mixer.

Due to the abrasive working environment of the mixer agitator, the pins are often replaced due to wear, as frequently as every month. In conventional mixers, the replacement of mixer pins is time consuming and disrupts the production cycle. If the mixer pins are not promptly replaced, an unwanted buildup of slurry results. In extreme cases, the slurry buildup leads to unwanted premature setting of portions of the slurry, which results in substandard wallboard panels, as well as expensive mixer clean up and related maintenance.

In a known wallboard mixer, the problem of rotor pin replacement was recognized. The pin was held to the agitator using a threaded stem or nipple engaged by a locknut located in a recess in the agitator. Since the locknut almost filled the recess, access to the locknut using conventional tools was difficult.

Accordingly, there is a need for an improved wallboard mixer pin that is more easily replaced to reduce maintenance-related downtime experienced in conventional wallboard mixers.

SUMMARY

The above-listed need is met or exceeded by the present combination of a gypsum mixer rotor pin and an insertion and removal tool. A key feature of the rotor pin is the placement of a transverse bore near the top of the rotor pin. The transverse bore is configured for accommodating a rod, preferably sized to slidably engage the bore. Another feature of the present pin is that the placement of the rod in the bore allows for the rotor pin insertion and removal tool to selectively engage the rod using a slot located on one end of the tool. An opposite end of the tool has a non-circular socket which accommodates a driver tool. The driver tool, in conjunction with the rotor pin, the rod, and the insertion and removal tool, are preferably used to replace rotor pins with relative ease, and at a faster rate than available in conventional models, thereby reducing maintenance-related downtime of wallboard mixers.

Additionally, the present rotor pin is preferably chrome-plated, extending the life span of the pin at least as much as ten-fold. As the chrome on the pin is worn away by the abrasive environment created by the slurry, the user is put on notice that it is time for the pin to be replaced to prevent unwanted buildup of slurry.

More specifically, an apparatus for inserting and removing a mixer rotor pin includes at least one rotor pin with a body having a transverse bore, as well as a rod dimensioned for slidably engaging the transverse bore. The apparatus also includes a mixer rotor pin insertion and removal tool having a tool body, compatibly shaped to cover the body of the rotor pin. A bottom of the tool has a slot for selectively engaging the aforementioned rod upon insertion of the rod into the transverse bore, and a top of the tool has a non-circular socket for accommodating a driver tool.

In a preferred embodiment, the body of the rotor pin is cylindrical. The body is also preferably chrome-plated to enhance its lifespan and to provide a user with notice of its general wear. However, the transverse bore is preferably left unplated. Moreover, in a preferred embodiment, the transverse bore is placed near the top of each rotor pin—more preferably, at a height three-quarters of the body height of the rotor pin, measured from a bottom of the body. Additionally, it is preferred that, given a cylindrical body of the rotor pin, a diameter of the transverse bore measure five-sixteenths the diameter of the body, and that each opening of the transverse bore has a chamfered edge.

A preferred embodiment of the apparatus also includes a threaded nipple configured for securing the rotor pin to a gypsum slurry mixer agitator. The threaded nipple is preferably attached to the bottom of the body of the rotor pin. In addition, the nipple preferably has a diameter two-thirds that of body of the rotor pin, as well as a chamfered bottom edge.

It is also preferred that the present apparatus include a rod that, when inserted into the transverse bore, is of sufficient length to selectively engage the slot of the rotor pin insertion and removal tool. A preferred rotor pin insertion and removal tool has a hexagonal socket for accommodating a hex wrench driver tool. Once the tool is engaged on the rod, rotation of the tool facilitates rotation of the mixer pin, either to remove an existing pin, or to tighten a replaced pin.

In another embodiment, a mixer rotor pin for creating shear forces in gypsum slurry includes a body with a transverse bore, the transverse bore dimensioned for slidably engaging a rod, and a threaded nipple attached to a bottom of the body.

Preferably, the body of the pin is cylindrical. Additionally, the transverse bore is preferably placed near the top of the rotor pin—more precisely, at a height three-quarters the body height of the rotor pin, measured from the bottom of the body. It is preferred that the diameter of the bore measures five-sixteenths the diameter of the body, and that each opening of the transverse bore has a chamfered edge. A preferred embodiment of the mixer rotor pin also includes a threaded nipple attached to the bottom of the body of the rotor pin for securing the rotor pin to a gypsum slurry mixer agitator. The threaded nipple preferably has a diameter two-thirds that of body of the rotor pin, as well as a chamfered bottom edge.

In still another embodiment, a mixer for formulating gypsum slurry includes a mixer housing defining a space into which a powdered material and a quantity of water is introducible for forming the slurry; an agitator rotatably mounted to the housing for rotation in the space; and at least one rotor pin configured for mounting to the agitator and projecting generally normally to the agitator. Each rotor pin has a body with a transverse bore, each rotor pin is configured for accommodating a rod dimensioned for slidably engaging the transverse bore; and each rotor pin is configured for being engaged by a mixer rotor pin insertion and removal tool having a tool body, shaped to compatibly engage the at least one rotor pin body, a bottom of the body having a slot for selectively engaging the rod upon insertion of the rod into the transverse bore, and an opposite top of the body having a non-circular socket for accommodating a driver tool.

DETAILED DESCRIPTION

Figure 1:
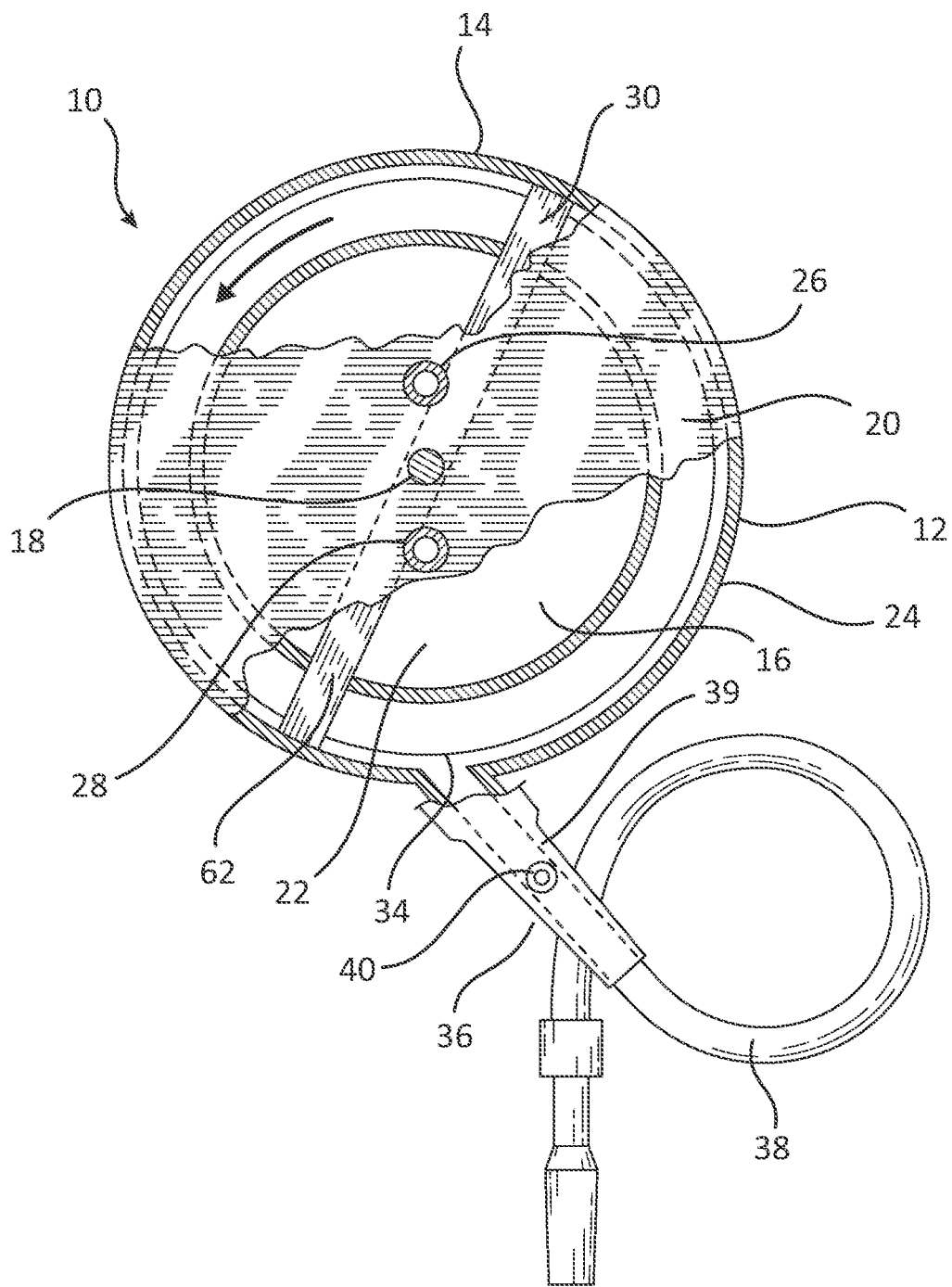
FIG. 1 is a fragmentary schematic overhead plan view of a gypsum slurry mixer.
Figure 1A:
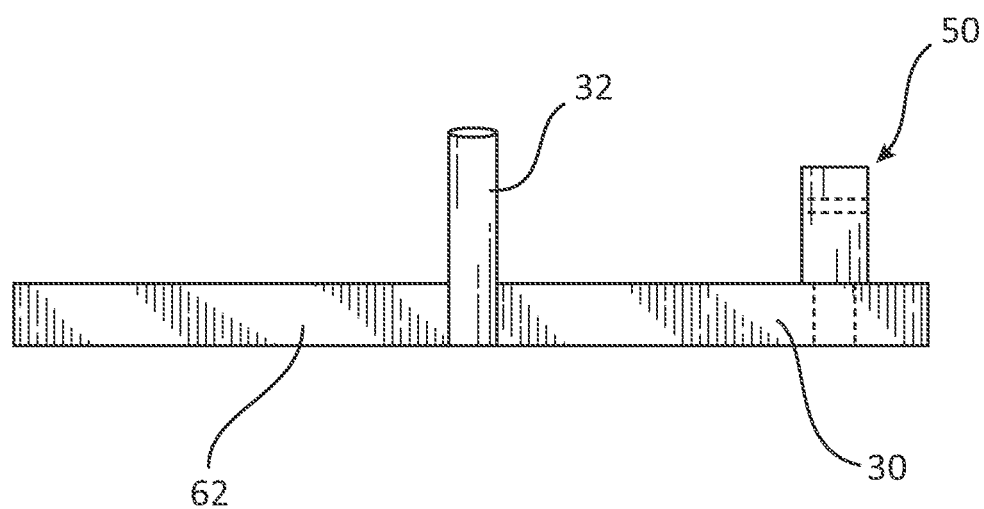
FIG. 1A is a side fragmentary view of a gypsum slurry mixer agitator with a mixer rotor pin mounted to the agitator.
Figure 3:
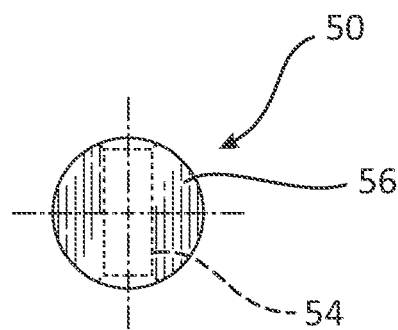
FIG. 3 is an overhead view of the gypsum slurry mixer rotor pin shown in FIG. 2.
Figure 2:
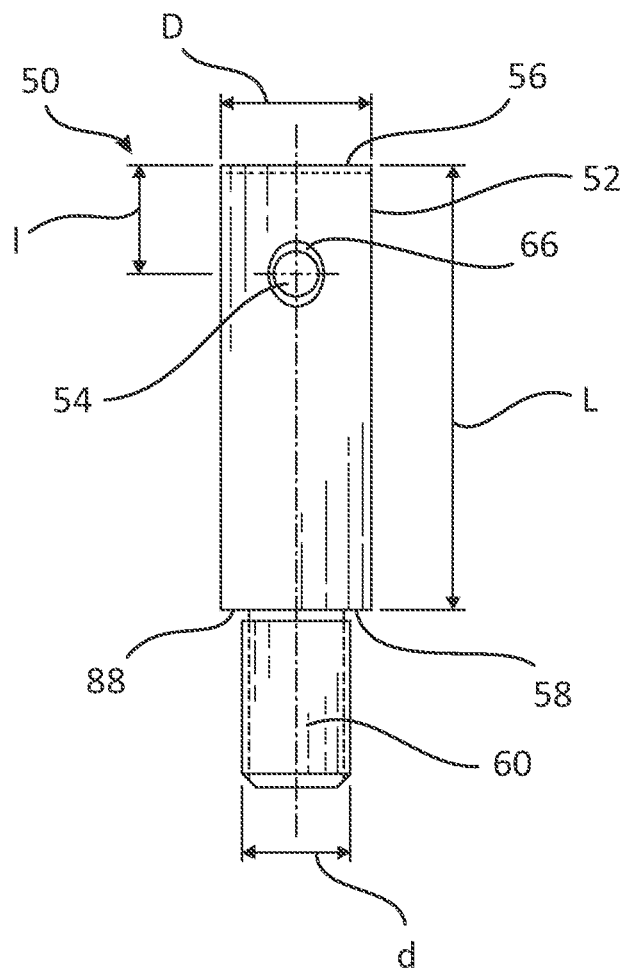
FIG. 2 is a side view of the present gypsum slurry mixer rotor pin.
Figure 2A:
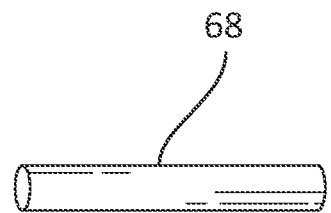
FIG. 2A is a side view of a rod used with the present rotor pin.

Referring now to FIG. 1, a mixing apparatus for mixing and dispensing a slurry is generally designated 10, and includes a mixer 12 having a housing 14 configured for receiving and mixing the slurry. The housing 14 defines a mixing chamber 16 which is preferably generally cylindrical in shape, has a generally vertical axis 18, an upper radial wall 20, a lower radial wall 22 and an annular peripheral wall 24. An inlet 26 for calcined gypsum and an inlet 28 for water are both positioned the upper radial wall 20 preferably proximate the vertical axis 18. It should be appreciated that the inlets 26, 28 are connected to gypsum and water supply containers respectively (not shown), such that gypsum and water are supplied to the mixing chamber 16 by simple gravity feed. It is contemplated that the positioning of the inlets 26, 28 may vary to suit the application. Also, as is well known in the art, in addition to gypsum and water, other materials or additives commonly employed in slurries to prepare gypsum products (e.g. accelerators, retarders, fillers, starch, binders, strengtheners, etc.) are optionally supplied through these or other inlets similarly positioned.

An agitator 30 is disposed in the mixing chamber 16, has a generally vertical drive shaft 32 positioned concentrically with the vertical axis 18 and extends through the upper radial wall 20. The shaft 32 is connected to a conventional drive source, such as a motor (not shown) for rotating the shaft at whatever speed is appropriate for agitating the agitator 30 to mix the contents of the mixing chamber 16. Speeds in the range of 275-300 rpm are common. This rotation directs the resulting aqueous slurry in a generally centrifugal direction, such as in a counterclockwise outward spiral. It should be appreciated that this depiction of an agitator is relatively simplistic and meant only to indicate the basic principles of agitators commonly employed in gypsum slurry mixing chambers known in the art, some of which are described above. Alternative agitator designs, including those employing pins, paddles, or rotary discs are contemplated.

An outlet 34, also referred to as a mixer outlet, a discharge gate or a slot, is provided in the peripheral wall 24 for the discharge of the major portion of the well-mixed slurry into what is generally referred to herein as a mixing and dispensing apparatus 36. As is the case with conventional outlets, the present outlet 34 is preferably rectangular in cross-section, however other shapes are contemplated depending on the application. Also, while it is contemplated that the specific configuration of the mixer 12 may vary, it is preferred that the present mixer is of the centrifugal type commonly used in the manufacture of gypsum wallboard, and also of the type in which the outlet 34 dispenses the slurry tangentially to the housing 14.

The mixing and dispensing apparatus 36 includes an elongate, preferably cylindrical tube or conduit 38 and having a main inlet 39 in slurry receiving communication with the mixer outlet 34, and has an additive inlet 40 such as a nipple for the introduction of aqueous foam or other desired additive, such as retarders, accelerators, dispersants, starch, binders, and strength-enhancing products such as poly-phosphates, typically sodium trimetaphosphate, all of which are known in the wallboard art, after the slurry has been substantially mixed. It is desired that when foam is the additive, it is uniformly mixed in the slurry but not excessively agitated to the extent that it is broken down. As such, it is common to introduce the foam into the additive inlet 40 just after or downstream of, yet close to the outlet 34 and the main inlet 39 to prolong mixing time with the slurry. However, depending on the particular application, it is contemplated that the additive such as foam may be introduced at other places along the apparatus 36.

Referring now to FIGS. 1A-3, the present gypsum mixer rotor pin is generally designated 50 and has a preferably cylindrical body 52 with a transverse bore 54, a top end 56 and an opposite bottom end 58. Other shapes of the body 52 are contemplated depending on the application, including polygonal, or asymmetrically or irregularly shaped. Preferably, attached to the bottom end 58 of the body 52 is a threaded nipple 60 for releasably securing the body 52 to the agitator 30. When attached to the agitator 30, the body 52 preferably projects parallel to the rotational axis 18 of the agitator 30. In addition, the body 52 preferably projects normally to an arm or main element 62 of the agitator. It is preferred that the threaded nipple 60 has a diameter "d" $\frac{2}{3}$ that of a diameter "D" of the body 52 and a chamfered bottom edge 64. The body 52 is preferably chrome-plated, while the transverse bore 54 and threaded nipple 60 are preferably left unplated.

In a preferred embodiment, the transverse bore 54 is placed at a height or length "I" located $\frac{3}{4}$ of a total height or length "L" of the body 52, "I" being measured from the top end 56 of the body 52. Preferably, the diameter of the bore 54 preferably measures $\frac{5}{16}$ the diameter "D" of the body 52. Moreover, it is preferred that the bore 54 has a pair of opposing openings, each opening having a chamfered edge 66 for the ideal accommodation of a rod, generally designated 68. A diameter of the rod 68 is dimensioned to slidably engage the bore 54, and a length of the rod is preferably dimensioned to sufficiently engage a mixer rotor pin insertion and removal tool, generally designated 70.

Figure 4:
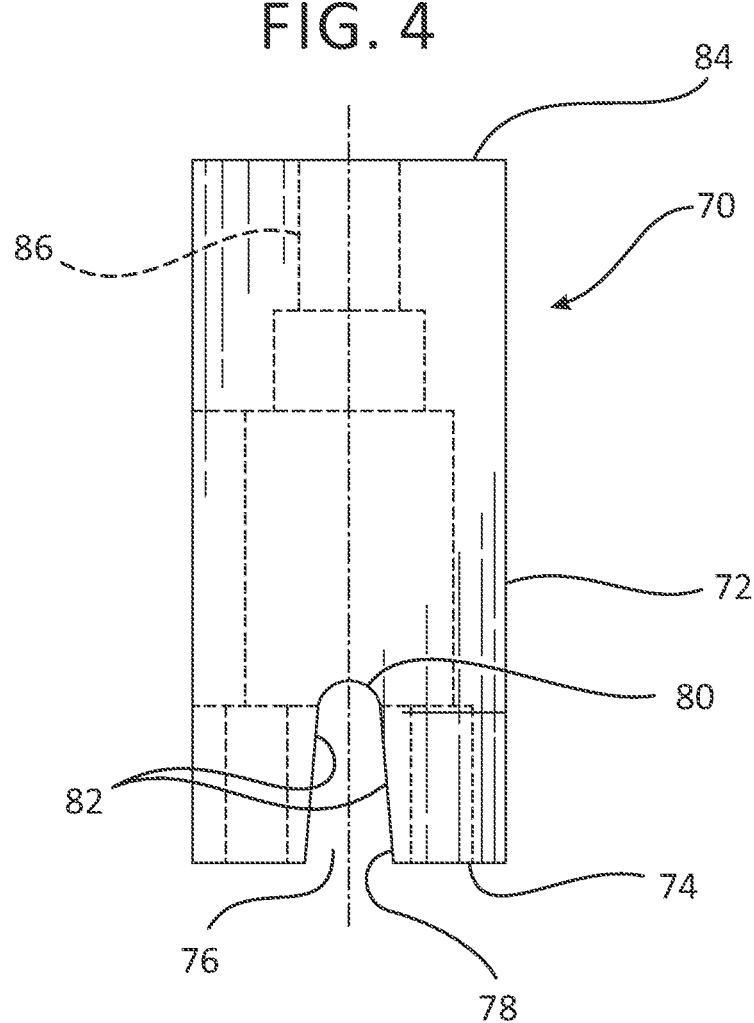
FIG. 4 is a side view of the present gypsum slurry mixer rotor pin insertion and removal tool.
Figure 5:
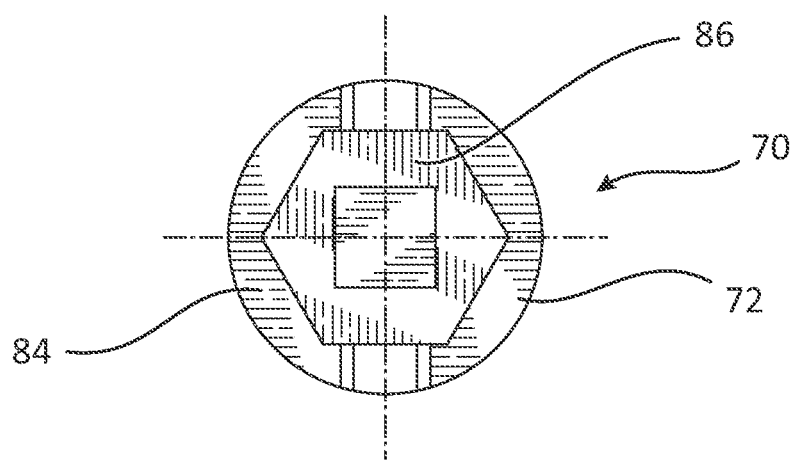
FIG. 5 is an overhead view of the gypsum slurry mixer rotor pin insertion and removal tool shown in FIG. 4.
Figure 6:
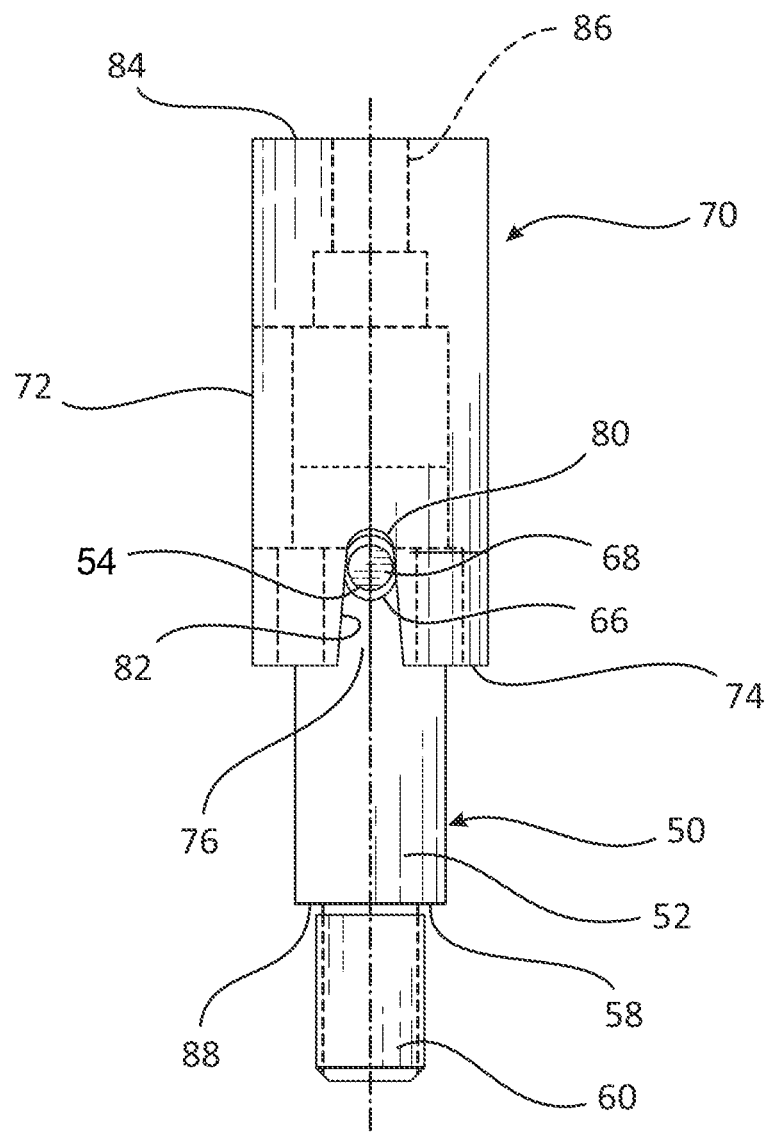
FIG. 6 is a side view of the gypsum slurry mixer rotor pin insertion and removal tool, shown in FIG. 4, fixed on the mixer rotor pin, shown in FIG. 2.

Referring now to FIGS. 4-6, the present gypsum mixer rotor pin insertion and removal tool 70 has a tool body 72 dimensioned for compatibility with the pin body 52, so the tool body slidably accommodates the pin 50 (FIG. 6). A bottom 74 of the tool body 72 defines a slot 76, dimensioned for selectively engaging the rod 68, when the rod is inserted into the transverse bore 54. In the preferred embodiment, the slot 76 is dimensioned for facilitating the location of the tool 70 upon the rod 68 so that, as described in greater detail below, upon rotation of the tool, sufficient torque is exerted on the pin 50 to enhance removal from the agitator 30. More specifically, an open end 78 of the slot 76 is wider than an opposite, apex end 80, which is preferably arcuate to accommodate the diameter of the rod 68. Sidewalls 82 of the slot 76 taper from the open end 78 to the apex end 80 and preferably form a general inverted "V" shape.

Opposite the bottom end 74 of the tool body 72 is a top end 84 having a non-circular socket 86 configured for accommodating a driver tool (not shown). Contemplated tools include ratchet wrenches, Allen wrenches or the like as are well known in the art. It should be appreciated that the depiction of the hexagonal socket 84 in FIG. 5 represents a preferred embodiment, alternative non-circular socket shapes—such as square, octagonal, and others—are contemplated.

Referring now specifically to FIG. 6, when in use, the rotor pin insertion and removal tool 70 is positioned on the pin body 52, so the slot 76 is engaged upon the rod 68 located in the transverse bore 54. When a driver tool engages the socket 84 and is manipulated to create torsion (rotated clockwise or counterclockwise, depending on the desired action), the tool body 72 acting on the rod 68 axially rotates the pin 50.

Returning now to FIGS. 1A and 2, once the pin 50 is fully engaged in the arm 62, a shoulder 88 of the pin body 52 rests upon the arm. Thus, the shoulder 88 facilitates support of the pin 50 on the agitator arm 62.

While a particular embodiment of the present gypsum mixer rotor pin and insertion and removal tool has been described herein, it will be appreciated by those skilled in the art that changes and modifications may be made thereto without departing from the invention in its broader aspects and as set forth in the following claims.

The invention claimed is:

1. An apparatus for inserting and removing a mixer rotor pin used for mixing a wallboard slurry and a such a rotor pin, comprising:
   at least one rotor pin having a body with a transverse bore, and an outer surface, said rotor pin body having a top end and an opposing bottom end;
   a rod dimensioned for slidably engaging said transverse bore;
   a mixer rotor pin insertion and removal tool having a tool body, said tool body having a tool body bore shaped to compatibly engage said at least one rotor pin body, a bottom of the tool body having a slot with an open end, a closed end, and sidewalls that taper from said open end to said closed end for selectively engaging said rod upon insertion of said rod into said transverse bore, and an opposite top of the body having a non-circular socket for accommodating a driver tool;
   wherein said tool body slidingly engaged with said outer surface of said rotor pin near said top end as said rod engages said traverse bore; and
   wherein said top end of said rotor pin body is positioned within said tool body bore when said rod is engaged with said transverse bore.

2. The apparatus as defined in claim 1, wherein each said at least one rotor pin has a cylindrical body, said body having a body diameter and said transverse bore having a bore diameter 5/16 of said body diameter.

3. The apparatus as defined in claim 1, wherein each said at least one rotor pin is chrome-plated on said body and said transverse bore is unplated.

4. The apparatus as defined in claim 1, wherein said transverse bore is placed at a height measured from a bottom end that is 3/4 of said height of said body.

5. The apparatus as defined in claim 1, wherein said transverse bore has a pair of opposing openings, each said opening has a chamfered edge.

6. The apparatus as defined in claim 1, wherein said rod, upon insertion into said transverse bore, is of sufficient length to extend from opposing ends of said outer surface of said rotor pin body to selectively engage said slot of said mixer rotor pin insertion and removal tool.

7. The apparatus as defined in claim 1, wherein each said at least one rotor pin has a threaded nipple attached to the bottom of said body.

8. The apparatus as defined in claim 7, wherein said body has a body diameter, and said threaded nipple has a nipple diameter 2/3 that of said body diameter.

9. The apparatus as defined in claim 7, wherein said threaded nipple has a chamfered bottom edge.

10. The apparatus as defined in claim 1, wherein the said mixer rotor pin insertion and removal tool has a hexagonal socket for accommodating a hex wrench driver tool.

11. A mixer rotor pin for creating shear forces in gypsum slurry, comprising:
   a body with a transverse bore;
   said transverse bore dimensioned for slidably engaging a rod; and
   a threaded nipple attached to the bottom of said body;
   wherein said body has a body diameter, and said threaded nipple has a nipple diameter less than that of said body diameter;
   wherein said transverse bore is placed at a height measured from a bottom end that is 3/4 of said height of said body, said transverse bore having a bore diameter 5/16 of said body diameter; and
   wherein said nipple diameter is 2/3 that of said body diameter.

12. The rotor pin as defined in claim 11, wherein said body is cylindrical.

13. The rotor pin as defined in claim 11, wherein said transverse bore has a pair of opposing openings, each said opening has a chamfered edge.

14. The rotor pin as defined in claim 11, wherein said threaded nipple has a chamfered bottom edge.

15. An apparatus for inserting and removing a mixer rotor pin used for mixing a wallboard slurry, and such a rotor pin, comprising:
   at least one rotor pin having a body a transverse bore and an outer surface, said rotor pin body having a top end and an opposing bottom end;
   a rod dimensioned for slidably engaging said transverse bore;
   a mixer rotor pin insertion and removal tool having a tool body, said tool body having a tool body bore shaped to compatibly engage said at least one rotor pin body, a bottom of the body having a slot with an open end, a closed end, and sidewalls that taper from said open end to said closed end for selectively engaging said rod upon insertion of said rod into said transverse bore, and an opposite top of the body having a non-circular socket for accommodating a driver tool;
   wherein said tool body slidingly engages with said outer surface of said rotor pin near said top end as said rod slidingly engages said transverse bore and is engaged by said slot;

wherein said top end of said rotor pin body is positioned within said tool body bore when said rod is engaged with said transverse bore;

wherein each said at least one rotor pin has a cylindrical body, said body having a body diameter and said transverse bore having a bore diameter $5/16$ of said body diameter;

wherein said transverse bore is placed at a height measured from a bottom end that is $3/4$ of said height of said body; and wherein each said at least one rotor pin has a threaded nipple attached to the bottom of said body, and said threaded nipple has a nipple diameter $2/3$ that of said body diameter.

\* \* \* \* \*